(12) United States Patent
Ubillos

(10) Patent No.: US 8,810,692 B2
(45) Date of Patent: Aug. 19, 2014

(54) ROLLING SHUTTER DISTORTION CORRECTION

(75) Inventor: Randy Ubillos, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 281 days.

(21) Appl. No.: 13/108,828

(22) Filed: May 16, 2011

(65) Prior Publication Data

US 2012/0092559 A1     Apr. 19, 2012

Related U.S. Application Data

(60) Provisional application No. 61/394,738, filed on Oct. 19, 2010.

(51) Int. Cl.
*H04N 5/217* (2011.01)
*H04N 7/26* (2006.01)

(52) U.S. Cl.
CPC ................................. *H04N 7/26888* (2013.01)
USPC ........ 348/241; 348/242; 348/243; 348/226.1; 348/227.1

(58) Field of Classification Search
USPC ............ 348/226.1, 227.1, 241, 242, 243, 362
See application file for complete search history.

(56) References Cited

U.S. PATENT DOCUMENTS

| | | | |
|---|---|---|---|
| 7,675,552 B2 * | 3/2010 | Ono et al. | 348/228.1 |
| 7,720,309 B2 | 5/2010 | Sasaki et al. | |
| 2007/0120997 A1 | 5/2007 | Sasaki et al. | |
| 2007/0154202 A1 | 7/2007 | Lee et al. | |
| 2008/0144964 A1 | 6/2008 | Soinio et al. | |
| 2009/0021588 A1 | 1/2009 | Border et al. | |
| 2009/0160957 A1 | 6/2009 | Deng et al. | |
| 2009/0201383 A1 | 8/2009 | Slavin | |
| 2010/0166300 A1 | 7/2010 | Spampinato et al. | |
| 2010/0271538 A1 * | 10/2010 | Indo | 348/362 |

OTHER PUBLICATIONS

Chun et al., "Suppressing Rolling-Shutter Distortion of CMOS Image Sensors by Motion Vector Detection", IEEE Transactions on Consumer Electronics, vol. 54, No. 4, Nov. 2008, pp. 1479-1487.

Pachur et al., "Real-time Simulation of Motion-based Camera Disturbances", http://isi.uni-bremen.de/~timlaue/SimRobotSensorDisturbance.pdf, Jan. 1, 2009, 11 pages.

Liang et al., "Analysis and Compensation of Rolling Shutter Effect", IEEE Transactions on Image Processing, Vol. 17, No. 8, Aug. 2008, pp. 1323.

* cited by examiner

*Primary Examiner* — Yogesh Aggarwal

(74) *Attorney, Agent, or Firm* — Kenyon & Kenyon LLP

(57) ABSTRACT

Methods, systems, and apparatus, including computer programs encoded on a computer storage medium, for performing rolling shutter distortion corrections are described. A video clip captured by a user is received and each of a plurality of predefined affine transforms for rolling shutter distortion correction is applied to the received video clip. Further, a visual indication of results from each of the plurality of the predefined affine transforms is presented to the user and input is received from the user selecting one of the visual indications. Furthermore, the predefined affine transform corresponding to the selected visual indication is associated with a device that acquired the received video clip. Additionally, the association can be stored, and the stored association can be used later to automatically perform a rolling shutter distortion correction on another video clip upon detecting that the other video clip comes from same device that already went through a calibration sequence.

27 Claims, 5 Drawing Sheets

ROLLING SHUTTER DISTORTION CORRECTION

CLAIM OF PRIORITY

This application claims priority under 35 USC §119(e) to U.S. Patent Application Ser. No. 61/394,738, filed on Oct. 19, 2010, the entire contents of which are hereby incorporated by reference.

BACKGROUND

This specification relates to correcting for a rolling shutter distortion in digital images, for example, a video clip composed of a sequence of digital images.

Complementary metal oxide semi-conductor (CMOS)-based camera sensors have a rolling shutter, as opposed to having a global shutter like, e.g., charge-coupled device (CCD)-based camera sensors. Consequently, pixels of a CMOS-based camera sensor are read top-to-bottom, left-to-right, such that the data read at the top of the frame is acquired at a point in time different than the time when the data at the bottom of the frame was acquired. Accordingly, when the camera happens to be moving (e.g., panning) during the roller shutter sequence the resulting image will appear to be tilted. For example, if the camera is panning left (or right) while the shutter is rolling, the resulting image will appear to be tilted to the left (or right). As another example, when panning up (or down), the image appears stretched (or compressed). The tilt angle of the image caused by the rolling shutter is proportional to the speed of the pan. Moreover, the tilt angle is inversely-proportional to the reading (scanning) rate of the pixels of the CMOS sensor. For example, the effect is exaggerated for inexpensive CMOS sensors, which tend to be slow. Additionally, most digital single-lens reflex cameras (DSLR) have large sensors, and, because reading a large sensor tends to take a long time, DSLR cameras especially tend to suffer from rolling shutter distortion.

SUMMARY

This specification describes technologies relating to correcting for rolling shutter distortion.

In general, one aspect of the subject matter described in this specification can be implemented in methods that include the actions of receiving a video clip and determining whether the received video clip was captured using a known video capture device. If the video capture device is determined to be known, the methods further include the actions of using a predefined affine transform associated with the known video capture device to perform a rolling shutter distortion correction. If the video capture device is determined to be unknown, the methods include the actions of prompting a user of the data processing apparatus to perform a calibration process on the unknown video capture device.

Other aspects include corresponding computer systems, apparatus, and computer programs recorded on one or more computer storage devices, each configured to perform the actions of the methods. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The foregoing and other embodiments can each optionally include one or more of the following features, alone or in combination. In some implementations, the methods can include the actions of receiving information corresponding to a result of the calibration process, and using the received information to perform the rolling shutter distortion correction for the received video clip. In some implementations, the methods can include the actions of storing the received information in a profile associated with the unknown video capture device. The stored information can include an association between the video capture device's unique identifier and the predefined affine transform to be used for rolling shutter distortion correction.

In some implementations, the predefined affine transform is selected from among a plurality of predefined affine transforms. For example, the plurality of predefined affine transforms includes at least four different predefined affine transforms. As another example, each of the plurality of predefined affine transforms corresponds to a different shutter speed.

Another aspect of the subject matter described in this specification can be implemented in methods that include the actions of receiving a video clip captured by a user and applying each of a plurality of predefined affine transforms for rolling shutter distortion correction to the received video clip. Further, the methods include the actions of presenting a visual indication to the user of results from each of the plurality of the predefined affine transforms and receiving input from the user selecting one of the visual indications. Furthermore, the methods include the actions of associating the predefined affine transform corresponding to the selected visual indication to a device that acquired the received video clip.

Other aspects include corresponding computer systems, apparatus, and computer programs recorded on one or more computer storage devices, each configured to perform the actions of the methods.

The foregoing and other implementations can each optionally include one or more of the following features, alone or in combination. In some implementations, the methods can include the actions of storing the association, and using the stored association later by automatically performing a rolling shutter distortion correction on another video clip upon detecting that the other video clip comes from same device that already went through a calibration sequence. In some implementations, each of the plurality of predefined affine transforms can correspond to a different shutter speed.

Particular implementations of the subject matter described in this specification can be configured so as to realize one or more of the following potential advantages. A user associated with the image processing application implementing the disclosed techniques can instruct the software application to perform rolling shutter distortion correction on a timed sequence of image frames without knowledge of a set of parameters specific to an image-capture device used to acquire the timed sequence of image frames. Further, a unique identifier of the image-capture device used to capture the timed sequence of image frames (e.g., a serial number of a video camera, or a serial number of a CMOS sensor of the video camera) can be used by the software application to correct for the rolling shutter effect in any other timed sequences of image frames captured by the image-capture device associated with the unique identifier. Further, an affine transform associated with the ID of the image-capture device can be selected from among multiple predefined affine transforms $A_1, A_2, \ldots, A_N$, where N=4, for example. A small number of affine transforms can correspond to shutter speed characteristics of the CMOS sensor type: slow, medium, high and ultra-high shutter speeds. Accordingly, ever-multiplying types of CMOS sensors corresponding to the commercially available video cameras can be classified using the disclosed sparse shutter speed binning, thus avoiding the need to determine and store respective ever-multiplying affine transforms for performing rolling shutter distortion correction.

Details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The systems and techniques described in this specification are directed towards correcting image skew in digital images such a sequence of consecutive digital images making up a video clip or segment. The correcting process can include smoothing video clips affected by rolling shutter distortion. For example, the correction includes reducing skew and wobble distortion caused by a variety of CMOS-sensor-based devices, including iPhone® and Flip® Video Camcorders. The correction procedure can be fine-tuned by choosing between predetermined correction levels as described in detail below. In some implementations, the predetermined correction levels can correspond to respective low, medium, high and extra high shutter speeds of the CMOS-sensor corresponding to the image-capture devices that have acquired the video clips that are being corrected for the rolling shutter effect.

Figure 1:
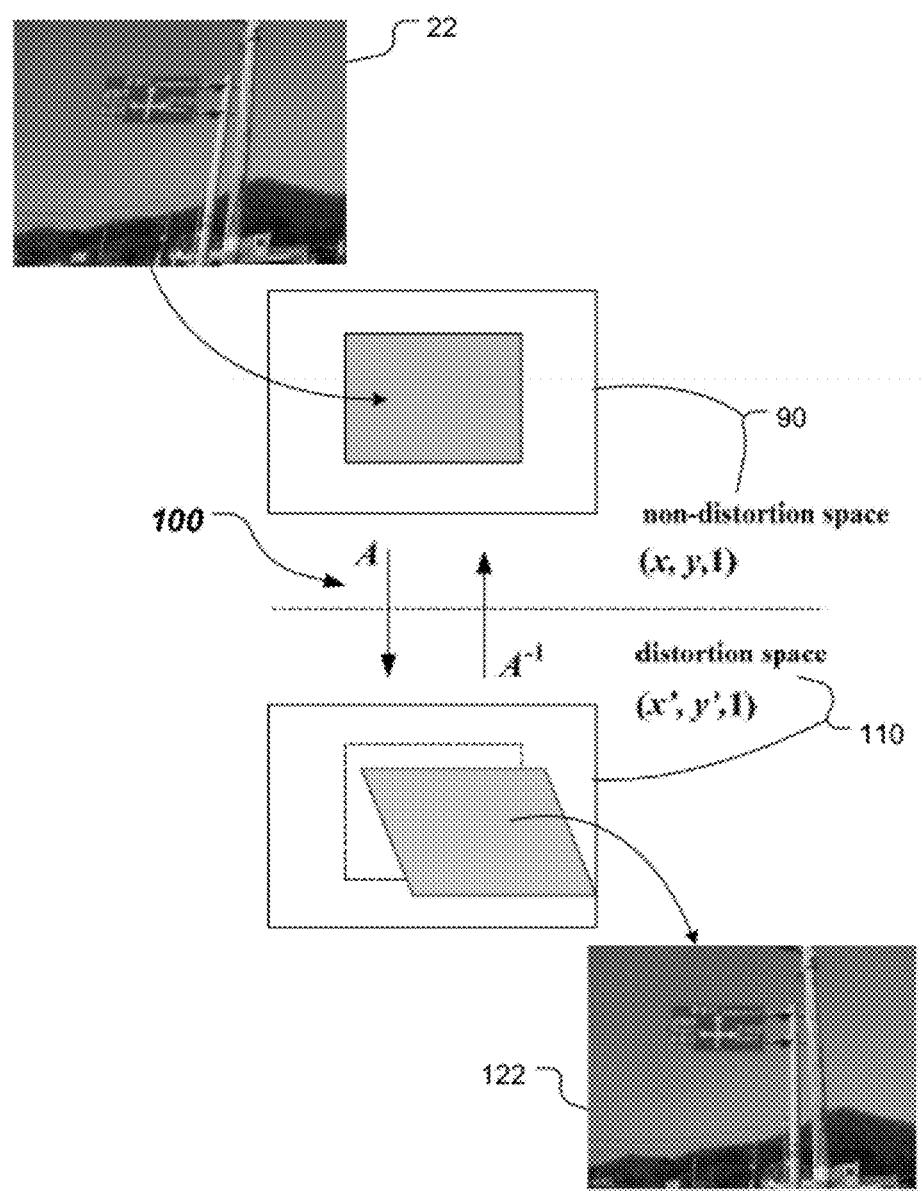
FIG. 1 shows an example of an affine transform to correct for the rolling shutter effect.

FIG. 1 shows an example of an affine transform that can be used to correct for the rolling shutter effect. The rolling shutter effect can be observed/detected when a video clip is imported in image processing applications, e.g., in Apple's iMovie. Such image processing applications can apply an image stabilization process to the imported video. For example, the image stabilization code can be configured to analyze, for every $10^{th}$ video frame, a frame and its preceding and succeeding frames to determine the velocity of most of the pixels in the frame. Based on the analysis, the image stabilization process can remove the effect of random motion (e.g., shaking) of the camera during exposure. Once the effect of shaking is removed, rolling shutter may be the dominant effect observable in the stabilized video frame 22, as illustrated in FIG. 1. For example, vertical poles appear to be tilted right, and the rectangular traffic sign appears skewed right in the frame 22 due to camera panning from left-to-right during the acquisition of frame 22 and because the camera has a slow CMOS-based sensor.

Multiple objects in the frame 22 can be affected differently by a rolling shutter. Objects that are closer to a panning camera move relatively slower than objects that are farther from the panning camera. Accordingly, the tilt of objects in the frame 22 is proportional to the distance from the camera to the objects. For example, the vertical poles in the background of video frame 22 appear to be more tilted than the vertical poles in the foreground of the same. In some implementations, the stabilizer code can be a dominant motion tracker, i.e., the output x- and y-translation speeds, Vx and Vy, are associated with most of pixels in the frame.

When only rectilinear and global pixel motions are considered, the video processor can perform an affine transform which can distort an image in the shape of a parallelogram, thus tilting the image left or right. For example, the affine transform 100 can be represented mathematically by a 3×3 matrix "A" that acts on pixels of image 22 in non-distorted space 90 to obtain a transformed image 122 in distorted space 110.

$$\begin{pmatrix} x' \\ y' \\ 1 \end{pmatrix} = \begin{pmatrix} a_{11} & a_{12} & a_{13} \\ a_{21} & a_{22} & a_{23} \\ 0 & 0 & 1 \end{pmatrix} \begin{pmatrix} x \\ y \\ 1 \end{pmatrix} = A \begin{pmatrix} x \\ y \\ 1 \end{pmatrix}. \quad (1)$$

As shown in EQ. 1, pixel locations in non-distorted space 90 and in distorted space 110 can be represented mathematically by column vectors. Since no change in size (horizontal scaling) occurs in the x-direction, and no shearing effect can be observed in the vertical direction, the matrix A of the affine transform 100 in EQ. 1 can be simplified as:

$$A = \begin{pmatrix} 1 & a_{12}(Vx, Vy; S) & a_{13}(Vx; S) \\ 0 & a_{22}(Vy; S) & a_{23}(Vy; S) \\ 0 & 0 & 1 \end{pmatrix} = A(Vx, Vy; S) = A_S(Vx, Vy). \quad (2)$$

As shown in EQ. 2, the coefficients of the affine transform 100's matrix A can depend on the horizontal and vertical components of the global pixel velocity (Vx, Vy), and additionally, on a set "S" of sensor specific parameters. While, the global pixel velocity within a video frame can vary from frame to frame, the set S sensor specific parameters is unique for a given sensor, as described in detail below.

For example, information about the velocity components Vx and Vy of the pixels in a frame 22 can be used to specify the tilt (or counter-distortion,) coefficient "$a_{12}$", of the affine transform 100's matrix A to correct the effect of the rolling shutter. Additionally, the image stabilization code is configured to estimate the global velocity of the pixels (i.e., how fast the camera was moving during the acquisition of the video.) For example, an x-translation speed Vx, and a y-translation speed Vy corresponding to the pixels in the frame 22 can be obtained by applying the stabilization code to the image.

The set S associated with a given sensor can include such sensor parameters as a number of rows of the given sensor, and a time required to read out a single row. Other sensor parameters can be a clock frequency, a frame rate, a blank time between image frames, and the like. Note, however, that some of the foregoing sensor specific parameters are interdependent, and therefore, can be redundant. The fact that the set S of sensor specific parameters is a constant for a given sensor has been expressed in EQ. 2 by separating the set S from the variables Vx, Vy through a semicolon: A(Vx, Vy; S). Equivalently, the same fact can be expressed in EQ. 2 by using the set-label "S" as an index (subscript) of the affine transform 100's matrix A, as opposed to the variables Vx and Vy, which are written in parentheses: $A_S$(Vx, Vy). In view of the foregoing functional properties, the affine transform A is a parametric function of variables Vx and Vy, and having parameters included in the set "S".

For example, a given CMOS sensor can have a maximum read-out speed, the rate at which the electronics can deliver (extract) the data from the sensor. Electronics that are slower than the sensor can set an upper bound for the read-out speed. The lower bound for the readout speed is the recording rate, e.g., $\frac{1}{30}$ sec. Usually, the scan rate ($\frac{1}{1000}$) sec is much faster than the recording rate ($\frac{1}{30}$) sec. Shutter speed represents an effective rate and it is not equivalent to the scan rate. Additionally, the size of the CMOS sensor can determine the shutter speed. In general, it takes a long time to read a large sensor, and therefore, cameras equipped with large sensors can also suffer from the rolling shutter effect. In view of the above, the set S of sensor specific parameters represents an effective measure of the CMOS sensor's shutter speed.

Moreover, it can be determined that there are a finite, small number of sets of camera specific parameters. For example, the finite number of sets can be four, and the four sets of sensor specific parameters can correspond respectively to CMOS-sensors having low, medium, high and extra high shutter speed. Based on the foregoing categories of CMOS-sensors, a CMOS sensor having a high scan rate and a small size can fall into the category of high shutter speed CMOS sensors, for instance. However, another CMOS sensor having a high scan rate but a large size can fall into the category of medium shutter speed CMOS sensors. Additionally, for example, a CMOS sensor having a low scan rate but a small size can also be categorized as a medium shutter speed CMOS sensor. In another example, a CMOS sensor having a low scan rate and a large size can be classified as a slow shutter speed CMOS sensor. The foregoing examples are not limiting, and different number of sets of camera specific parameters can be predetermined. For example, there can be two or three predetermined sets, or five, or eight predetermined sets, and so on, depending on the granularity that is desired for the affine transform 100 used to correct for the rolling shutter distortion.

Figure 2:
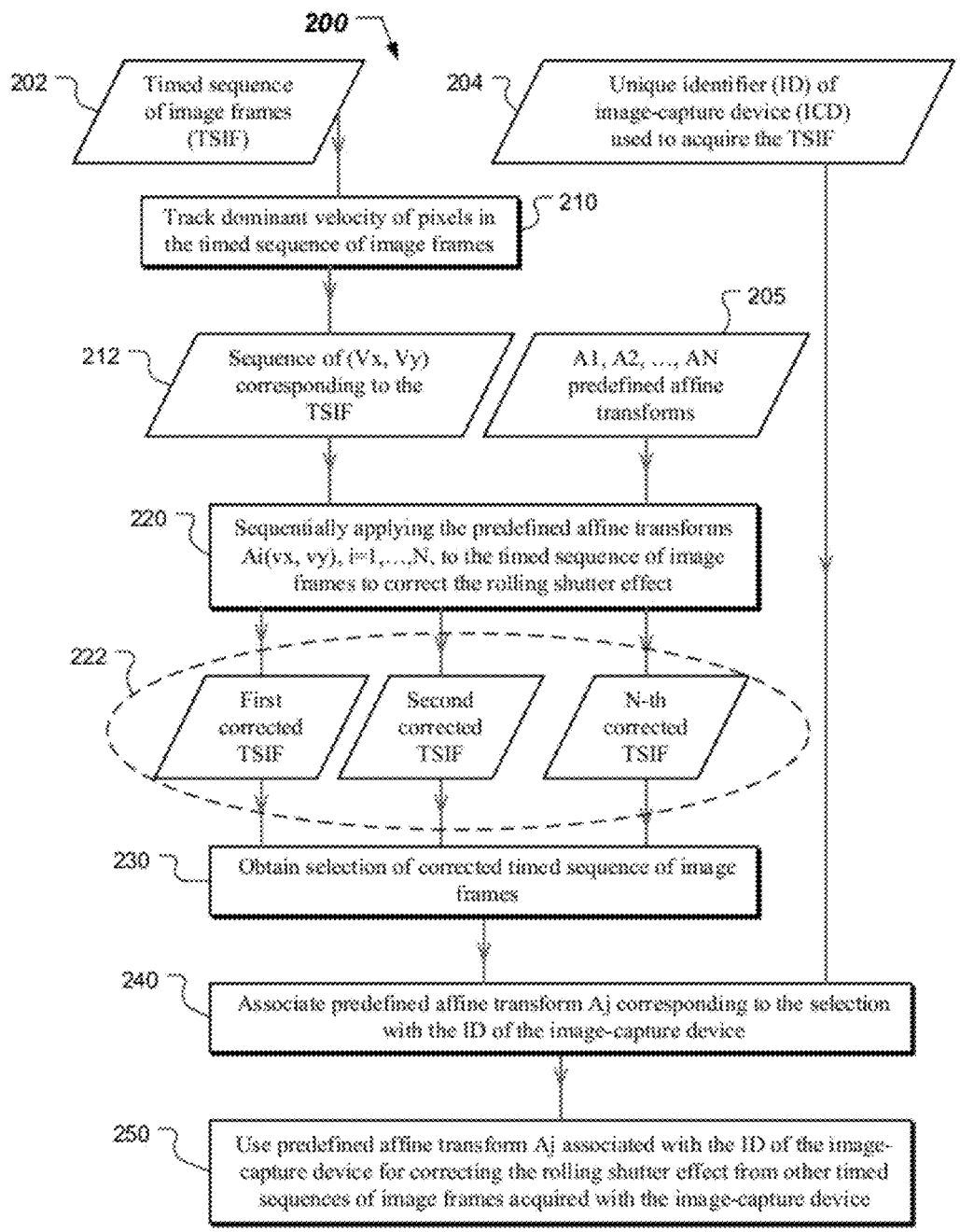
FIG. 2 shows an example of a method for associating an affine transform with a particular image-capture device for correcting the rolling shutter effect.

FIG. 2 shows an example of a method 200 for associating an affine transform with a particular image-capture device for correcting the rolling shutter effect. The method 200 can be implemented as a stand-alone software application or as a module of an image processing software application executed by a data processing apparatus. These or any other software implementations of the method 200 or portions of the method 200 are being referred to as the software application. A user associated with the data processing apparatus can instruct the software application configured to implement method 200 to remove the rolling shutter effect from a timed sequence of image frames 202 without having knowledge of the set "S" of parameters specific to the image-capture device used to acquire the timed sequence of image frames 202. For example, the timed sequence of image frames 202 can be a video clip. Moreover, by performing the method 200, a unique identifier (ID) 204 of the image-capture device used to capture the timed sequence of image frames 202 can be used by the software application to automatically trigger correction of the rolling shutter effect in any other timed sequences of image frames captured by the image-capture device associated with the unique identifier 204. For example, the ID 204 can be a serial number of a video camera. As another example, the ID 204 can be a serial number of a CMOS sensor of the video camera. Further, the affine transform associated with the ID 204 of the image-capture device is selected from among predefined affine transforms $A_1, A_2, \ldots, A_N$ 205. The notations $A_1, A_2, \ldots, A_N$ of the predefined affine transforms 205 represent short-hand notations for $A_{S1}, A_{S2}, \ldots, A_{SN}$, as the predefined affine transforms 205 correspond to respective sets $S_1, S_2, \ldots, S_N$ of sensor specific parameters, as described above in connection with FIG. 1. In some implementations, a number of predefined affine transforms 205 is four: $A_1, A_2, A_3$ and $A_4$, as described below in connection with FIG. 3C.

Figure 3A:
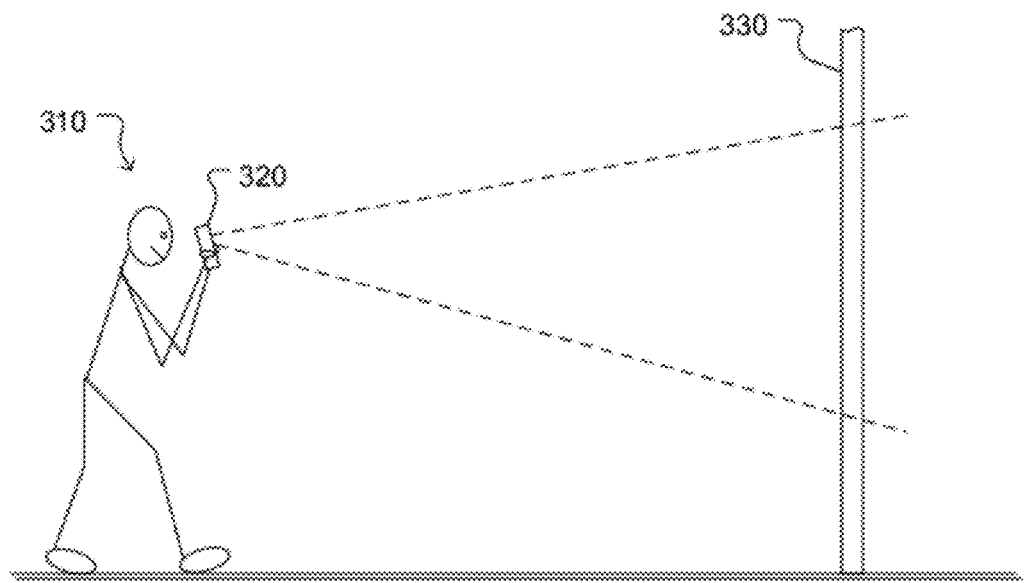
FIGS. 3A-3C shows aspects of a calibration process in accordance with the example method shown in FIG. 2.
Figure 3B:
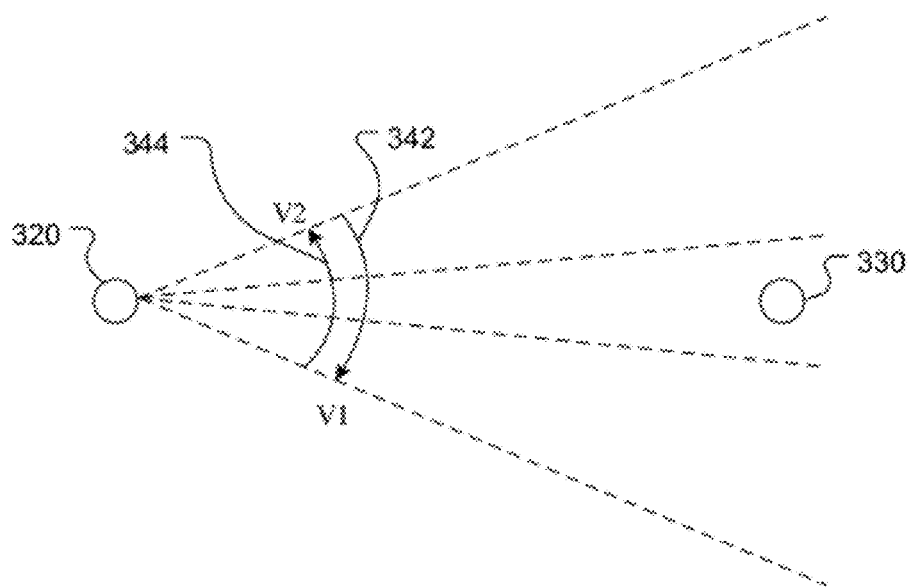
Figure 3C:
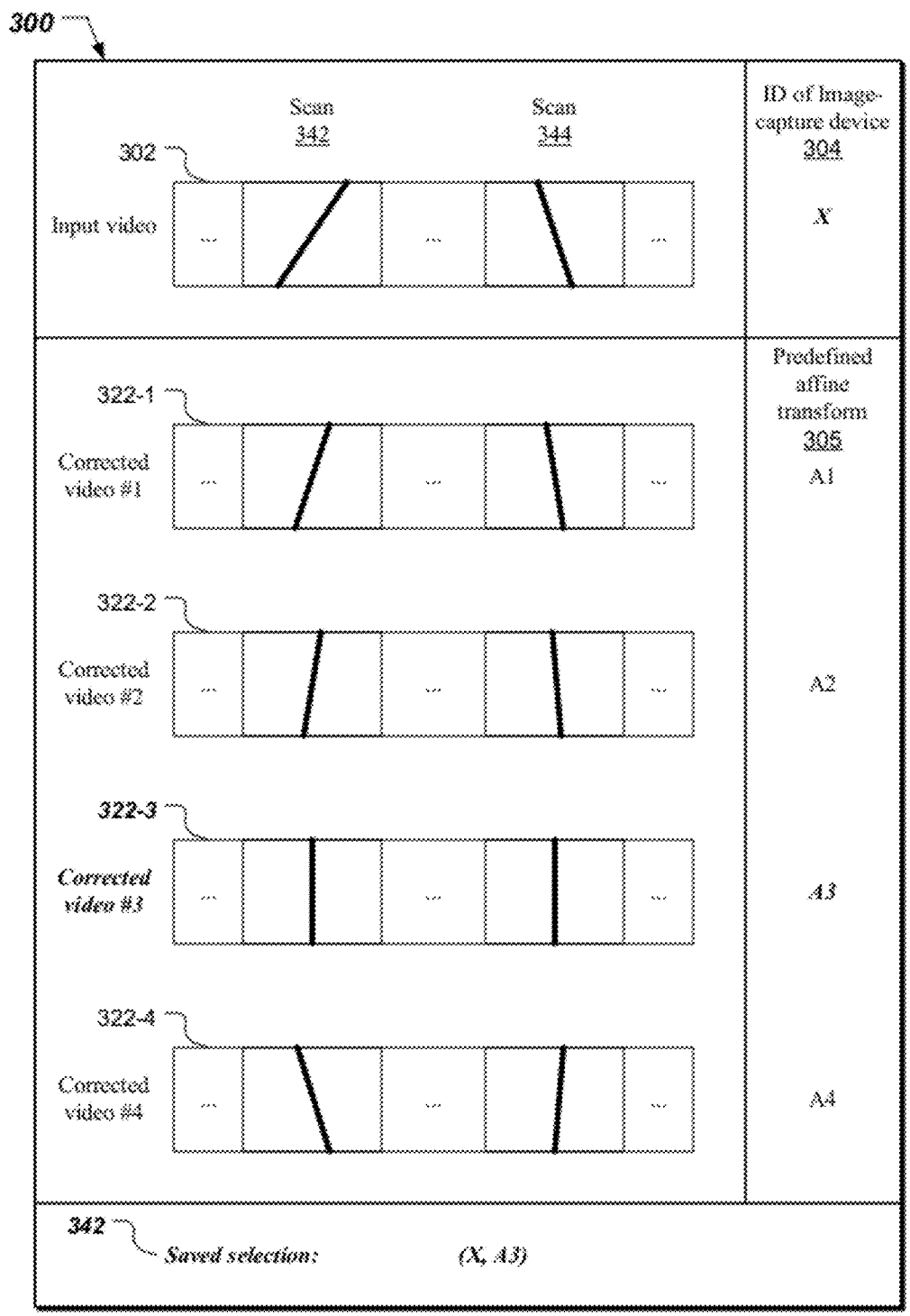

In the example implementation of method 200 that is illustrated in FIGS. 3A-3C, the timed sequence of image frames 202 can correspond to a calibration video clip 302. To acquire the calibration video clip 302, a user 310 associated with a video camera 320 having a video camera ID 304 "X", can point the video camera 320 to a vertical pole 330 (or any vertical line, edge, etc.) as depicted in FIGS. 3A-3B. Further, the user 310 can pan the video camera 320 horizontally, back-and-forth while recording the calibration video clip 302. For example, a scan 342 from left-to-right may be performed at constant speed V1, while another scan 344 from right-to-left may be performed at a different, smaller constant speed V2. Note that the speeds V1 and V2 need not be different or constant. FIG. 3C shows a graphical user interface 300 of an image processing application, the GUI 300 corresponding to a module for associating the ID 304 of the image capture device 330 with one of four predefined affine transforms 305. Note that the imported calibration video clip 302 includes frames corresponding to scan 342 in which the vertical pole 330 appears tilted right and frames corresponding to scan 344 in which the vertical pole 330 appears tilted left. The different magnitudes of the right and left tilt-angles are due to the different scan speeds V1 and V2 corresponding to respective scans 342 and 344.

Referring back to FIG. 2, at 210, the dominant velocity of pixels in the timed sequence of image frames 202 is tracked. In some implementations, every other $10^{th}$ frame of the timed sequence of image frames 202 can be analyzed for determining the magnitude and orientation of the Vx and Vy components of the overall velocity of the pixels 212 of the analyzed frame. Typically, this analysis includes determining a motion vector of the frame pixels with respect to one or more previous frames and one or more subsequent frames. For example, an analyzer component of the motion stabilizer module of Apple's iMovie application can track the global velocity vector 212 for a video clip.

At 220, the predefined affine transforms $A_i(Vx, Vy)$ 205, $i=1, \ldots, N$ are applied to the timed sequence of image frames 202 to obtain corrected timed sequence of image frames 222. For example, to obtain the first corrected timed sequence of image frames, the first predefined affine transform $A_1(Vx, Vy)$ can be applied to the timed sequence of image frames 202. The subscript "1" can correspond to a set "S1" of sensor specific parameters representative, for example, of the slowest shutter speed CMOS sensors. Applying the first predefined affine transform $A_1(Vx, Vy)$ to the timed sequence of image frames 202 may or may not remove, for example, the skew of vertical lines caused by the rolling shutter effect. As another example, to obtain the second corrected timed sequence of image frames, the second predefined affine transform $A_2(Vx, Vy)$ can be applied to the timed sequence of image frames 202. The subscript "2" can correspond to a set "S2" of sensor specific parameters representative, for example, of the next faster shutter speed CMOS sensors. Once again, applying the second predefined affine transform $A_2(Vx, Vy)$ to the timed sequence of image frames 202 may or may not remove, for example, the skew of vertical lines caused by the rolling shutter effect. And so on, and so forth until the $N^{th}$ corrected timed sequence of image frames is obtained by applying the $N^{th}$ predefined affine transform $A_N(Vx, Vy)$ to the timed sequence of image frames 202. The subscript "N" can correspond to a set "SN" of sensor specific parameters representative, for example, of the fastest shutter speed CMOS sensors. In this case extreme case, applying the $N^{th}$ predefined affine transform $A_N$(Vx, Vy) may have over-corrected the skew of vertical lines in the timed sequence of image frames 202, and may have caused for the $N^{th}$ corrected timed sequence of image frames to include vertical lines that are tilted in the opposite direction.

In the example implementation of method 200 that is illustrated in FIG. 3C, the corrected timed sequences of image frames 322-1, 322-2, 322-3 and 322-4 can be presented in the GUI 300. In this example, applying the predefined affine transforms $A_1$ and $A_2$ corresponding to the slow and medium shutter speed CMOS sensors cannot fully remove the skew of the vertical pole 330 caused by the rolling shutter effect, resulting in respective corrected videos 322-1 and 322-2 in which the vertical pole 330 appears tilted in the same direction as in the input calibration video clip 302. Additionally in this example, the predefined affine transform $A_4$ corresponding to the extra high shutter speed CMOS sensors overcorrected the skew of the vertical pole 330 caused by the rolling shutter effect, resulting in the corrected video 322-4 in which the vertical pole 330 appears tilted in the opposite direction relative to the input calibration video clip 302. However, the predefined affine transform $A_3$ corresponding to the high shutter speed CMOS sensors appears to have corrected the skew of the vertical pole 330 caused by the rolling shutter effect, resulting in corrected video 322-3 in which the vertical pole 330 appears vertical.

Referring again to FIG. 2, at 230, a selection of one of the corrected timed sequences of image frames 222 is obtained. In some implementations, the selection can be obtained automatically, by the software application running an algorithm for detecting vertical lines within the frames of the corrected timed sequences. In some implementations, the selection can be received as an instruction from a user associated with the software application who chooses a desired corrected timed sequence from among the corrected timed sequences of image frames 222. In the example implementation of method 200 that is illustrated in FIG. 3C, the selected corrected timed sequence 322-3 is highlighted in bold-italic font.

Returning once again to FIG. 2, at 240, the predefined affine transform $A_j$ corresponding to the obtained selection is associated with the ID 204 of the image-capture device used to capture the timed sequence of image frames 202. The association can be saved in persistent memory. In the example implementation of method 200 that is illustrated in FIG. 3C, the predefined affine transform $A_3$ associated with the selected corrected timed sequence 322-3 is highlighted in bold-italic font. Additionally, an indicator 342 of the GUI 300 shows that the association (X, $A_3$) of the predefined affine transform $A_3$ with the ID "X" 304 of the camera 320 has been saved for future use.

Referring back to FIG. 2, at 250, the predefined affine transform $A_j$ associated with the ID 204 of the image-capture device is used for performing the rolling shutter distortion correction in other timed sequences of image frames acquired with the image-capture device.

Figure 4:
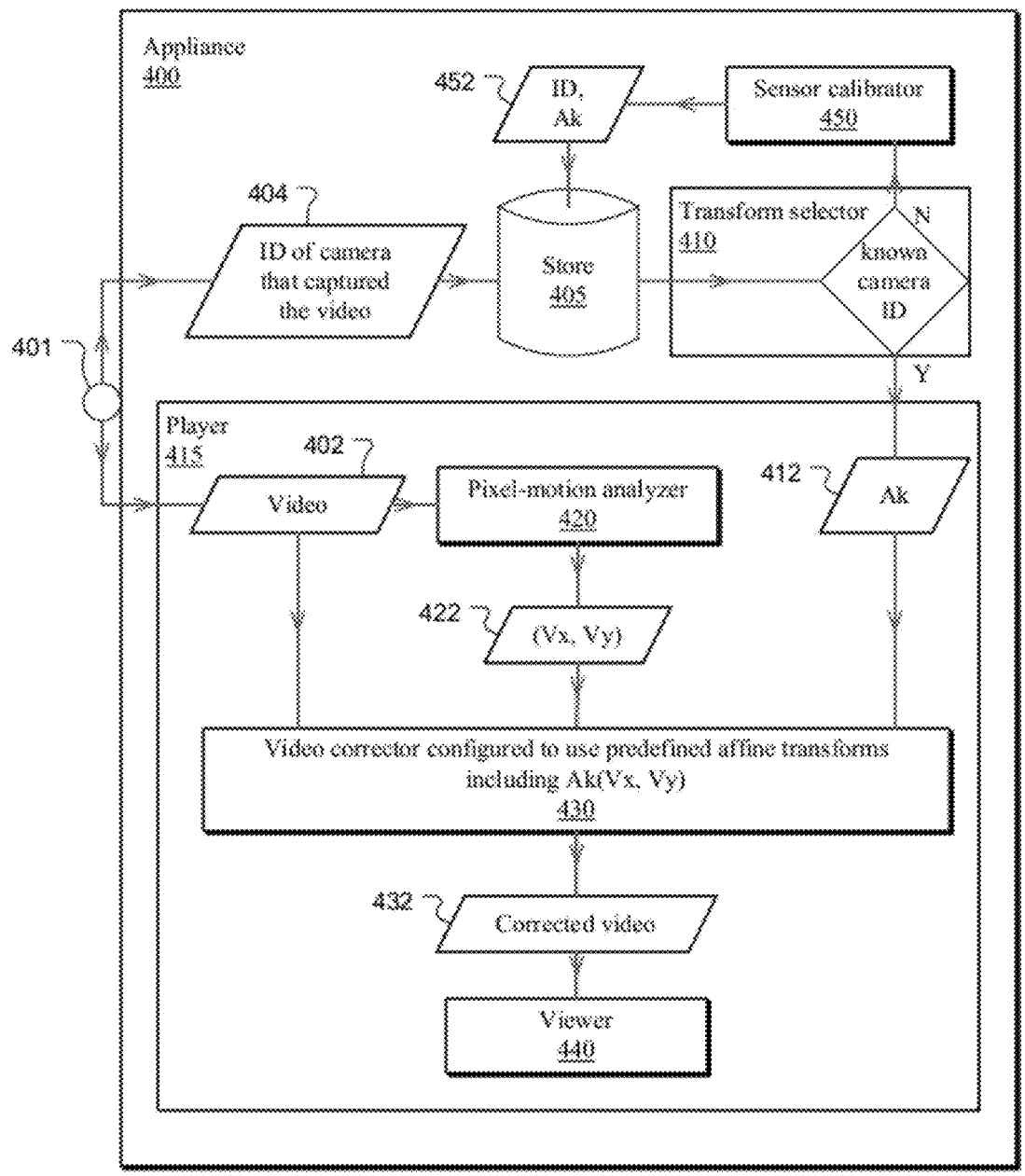
FIG. 4 shows an example of a system for correcting for the rolling shutter effect.

FIG. 4 shows an example of an appliance 400 for correcting for the rolling shutter effect in video clips. In some implementations, the appliance 400 is a computer system including one or more data processors and configured to run an image processing application configured to correct, among other things, the rolling shutter effect in a video 402. In some implementations, the appliance 400 can be a smart phone including one or more data processors and a camera based on a CMOS sensor. The appliance 400 can be configured to run a media player 415. The media player 415 can include a video corrector 430 configured to correct a video 402 acquired by the CMOS sensor, prior to rendering the acquired video 402 by the media player 430. The corrections can include, among other things, stabilizing the video 402 from random motion caused by shaking, and removing the effect of rolling shutter caused by panning, where the shaking and the panning occurred during acquisition of the video 402 by the onboard camera of the appliance 400.

The appliance 400 can receive a video 402 through an appliance input 401. The input 401 also receives an ID 404 of a camera that captured the video 402. When the appliance 400 is implemented as a computer system, the input 401 can be an interface between the appliance and a data repository storing the video 402 and the ID 404 of the camera that captured the video 402. When the appliance 400 is implemented as a smart phone including a video camera, the input 401 can be an interface between the onboard video camera and at least a processor of the appliance 400.

The appliance 400 further includes a store 405 storing information including associations between IDs of image-capture devices and corresponding affine transforms determined to correct for rolling shutter effect in videos acquired by the image-capture device associated with each of the IDs. The stored associations between the IDs of image-capture devices and corresponding affine transforms can be included in profiles associated with the respective image-capture devices. Moreover, the associations can include a finite number of predefined affine transforms. For example, the records stored on the store 405 can include associations between a first set of camera IDs and a first predefined affine transform, associations between a second set of camera IDs and a second predefined affine transform, associations between a third set of camera IDs and a third predefined affine transform, and associations between a fourth set of camera IDs and a fourth predefined affine transform. In this example, the first, second, third and fourth affine transforms can correspond to respective low, medium, high and extra high shutter speeds of the CMOS-sensor of the image-capture devices associated with the stored IDs.

If a transform selector 410 determines that the camera ID 404 is not known, i.e. the camera ID 404 is not stored on the store 405, then a sensor calibrator 450 can implement a method similar to method 200 (described above in connection with FIG. 2) for associating an affine transform $A_k$ from among the predefined affine transforms stored on the store 405 to the ID 404 of the camera that captured the video 402. Such association (ID, $A_k$) 452 can then be stored on the store 405 of the appliance 400, for example as part of a camera profile associated with camera ID 404. If the transform selector 410 determines that the camera ID 404 is known, i.e. the camera ID 404 is stored on the store 405, then the predefined affine transform $A_k$ 412 associated with the ID 404 is retrieved from the store 405 and relayed to the player 415 for future processing of the received video 402.

The received video 402 can be analyzed by a pixel-motion analyzer 420. The pixel-motion analyzer 420 can be configured to analyze, for example, every $N^{th}$ frame of the video 202 to determine the velocity vector of a majority of pixels of the analyzed frame. The determination can be based on a comparison between the pixel positions in the analyzed frame relative to the previous and subsequent frames. The output of the pixel motion analyzer 420 is the velocity vector (Vx, Vy) 422 corresponding to the analyzed frames.

The video corrector 430 can receive as input the video 402 and corresponding velocity vectors 422 to perform numerous corrections of the video 402. Some of such corrections can include motion stabilizer corrections to correct, for example, for shaking of the camera during acquisition of the video 402. Some of the mathematical transforms required for performing the motion stabilizer corrections are affine transforms $Bj(Vx, Vy)$, where $j=1, 2, \ldots$; The affine transforms $Bj$ are parametric functions of, among other things, variables $(Vx, Vy)$ and of parameters included in a parameter set "j". The nature and the physical meaning of the parameters from the parameter set "j" have been described elsewhere. In addition, the video corrector 430 receives the predefined affine transform $A_k$ 412 associated with the ID 404 of the video camera used to acquire the video 402. Accordingly, the video corrector 430 can correct for the rolling shutter effect using the predefined affine transform $A_k(Vx, Vy)$ as described above in connection with FIG. 1. The output of the video corrector 430 is a corrected video 432. The corrected video 432 can be motion stabilized and can have the skew due to the rolling shutter distortion corrected.

For example, the predefined affine transform $A_k(Vx, Vy)$ for correcting the rolling shutter distortion can be combined linearly with the affine transforms $Bj(Vx, Vy)$ corresponding to the motion stabilizer corrections. Moreover, the components of the velocity vector for the analyzed frames of the video 402, representing the variables $(Vx, Vy)$ of the predefined affine transform $A_k(Vx, Vy)$ for performing the rolling shutter distortion correction, are readily available as output of the image stabilization analysis 420. Consequently, the rolling shutter distortion correction can be performed in real-time without adding computational complexity to the other analyses and corrections performed on the video 402. For example, the calculation of the velocity-dependent tilt angle is performed once, upon detection of a pan, and then the tilt-distortion of the frame pixels given by the predefined affine transform $A_k(Vx, Vy)$ is performed at play-back time when the corrected video 432 is rendered by the viewer 440.

The image distortion caused by the predefined affine transform $A_k$ 412 can lead to generating black pixels near the edges of an image frame. Black pixels can also appear when applying the image stabilization algorithm and its corresponding affine transforms $Bj$. To avoid having to render black pixels, the image can be zoomed-up prior to applying the affine transforms $A_k$ and $Bj$. For example, the image can be zoomed-up by 3-4%.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   receiving a video clip;
   determining whether the received video clip was captured using a known video capture device;
   if the video capture device is determined to be known, using a predefined affine transform associated with the known video capture device to perform a rolling shutter distortion correction; and
   if the video capture device is determined to be unknown, prompting a user of the data processing apparatus to perform a calibration process on the unknown video capture device.

2. The method of claim 1 further comprising:
   receiving information corresponding to a result of the calibration process; and
   using the received information to perform the rolling shutter distortion correction for the received video clip.

3. The method of claim 2 further comprising storing the received information in a profile associated with the unknown video capture device, the stored information including an association between the video capture device's unique identifier and the predefined affine transform to be used for rolling shutter distortion correction.

4. The method of claim 1, wherein the predefined affine transform is selected from among a plurality of predefined affine transforms.

5. The method of claim 4, wherein the plurality of predefined affine transforms includes at least four different predefined affine transforms.

6. The method of claim 4, wherein each of the plurality of predefined affine transforms corresponds to a different shutter speed.

7. The method of claim 6, wherein the shutter speeds include low, medium, high and ultrahigh shutter speeds.

8. A system comprising:
   one or more hardware processors and one or more storage devices storing instructions that are operable, when executed by the one or more hardware processors, to cause the one or more hardware processors to perform operations comprising:
   receiving a video clip;

determining whether the received video clip was captured using a known video capture device;

if the video capture device is determined to be known, using a predefined affine transform associated with the known video capture device and stored on the one or more storing devices to perform a rolling shutter distortion correction; and if the video capture device is determined to be unknown, prompting a user of the system to perform a calibration process on the unknown video capture device.

9. The system of claim 8, wherein
the operations further comprise:
receiving information corresponding to a result of the calibration process; and
using the received information to perform the rolling shutter distortion correction for the received video clip.

10. The system of claim 9, wherein the operations further comprise storing on the one or more storage devices the received information in a profile associated with the unknown video capture device, the stored information including an association between the video capture device's unique identifier and the predefined affine transform to be used for rolling shutter distortion correction.

11. The system of claim 8, wherein the predefined affine transform is selected from among a plurality of predefined affine transforms.

12. The system of claim 11, wherein the plurality of predefined affine transforms includes at least four different predefined affine transforms.

13. The system of claim 11, wherein each of the plurality of predefined affine transforms corresponds to a different shutter speed.

14. The system of claim 13, wherein the shutter speeds include low, medium, high and ultrahigh shutter speeds.

15. A system comprising:
a display;
a memory to store a plurality of predefined affine transforms for rolling shutter distortion correction; and
a data processing apparatus configured to
receive a video clip captured by a user,
apply each of the plurality of the predefined affine transforms for rolling shutter distortion correction to the received video clip,
present on the display to the user a visual indication of results from each of the plurality of the predefined affine transforms,
receiving input from the user selecting one of the visual indications,
associating the predefined affine transform corresponding to the selected visual indication to a device that acquired the received video clip;
store the association in the memory, and
use the stored association later by automatically performing a rolling shutter distortion correction on another video clip upon detecting that the other video clip comes from same device that already went through a calibration sequence.

16. The system of claim 15, wherein each of the plurality of the predefined affine transforms corresponds to a different shutter speed.

17. A method performed by data processing apparatus, the method comprising:
receiving a video clip captured by a user;
applying each of a plurality of predefined affine transforms for rolling shutter distortion correction to the received video clip;

presenting to the user a visual indication of results from each of the plurality of the predefined affine transforms;
receiving input from the user selecting one of the visual indications;
associating the predefined affine transform corresponding to the selected visual indication to a device that acquired the received video clip;
storing the association; and
using the stored association later by automatically performing a rolling shutter distortion correction on another video clip upon detecting that the other video clip comes from same device that already went through a calibration sequence.

18. The method of claim 17, wherein each of the plurality of predefined affine transforms corresponds to a different shutter speed.

19. A non-transitory computer readable medium storing computer instructions executable by a data processing apparatus to perform:
receiving a video clip;
determining whether the received video clip was captured using a known video capture device;
if the video capture device is determined to be known, using a predefined affine transform associated with the known video capture device to perform a rolling shutter distortion correction; and
if the video capture device is determined to be unknown, prompting a user of the data processing apparatus to perform a calibration process on the unknown video capture device.

20. The non-transitory computer readable medium of claim 19 further performing:
receiving information corresponding to a result of the calibration process; and
using the received information to perform the rolling shutter distortion correction for the received video clip.

21. The non-transitory computer readable medium of claim 20 further performing storing the received information in a profile associated with the unknown video capture device, the stored information including an association between the video capture device's unique identifier and the predefined affine transform to be used for rolling shutter distortion correction.

22. The non-transitory computer readable medium of claim 19, wherein the predefined affine transform is selected from among a plurality of predefined affine transforms.

23. The non-transitory computer readable medium of claim 22, wherein the plurality of predefined affine transforms includes at least four different predefined affine transforms.

24. The non-transitory computer readable medium of claim 22, wherein each of the plurality of predefined affine transforms corresponds to a different shutter speed.

25. The non-transitory computer readable medium of claim 24, wherein the shutter speeds include low, medium, high and ultrahigh shutter speeds.

26. A non-transitory computer readable medium storing computer instructions executable by a data processing apparatus to perform:
receiving a video clip captured by a user;
applying each of a plurality of predefined affine transforms for rolling shutter distortion correction to the received video clip;
presenting to the user a visual indication of results from each of the plurality of the predefined affine transforms;
receiving input from the user selecting one of the visual indications;

associating the predefined affine transform corresponding to the selected visual indication to a device that acquired the received video clip;

storing the association; and using the stored association later by automatically performing a rolling shutter distortion correction on another video clip upon detecting that the other video clip comes from same device that already went through a calibration sequence.

27. The non-transitory computer readable medium of claim 26, wherein each of the plurality of predefined affine transforms corresponds to a different shutter speed.

* * * * *